United States Patent [19]
Chesnut

[11] Patent Number: 5,926,991
[45] Date of Patent: Jul. 27, 1999

[54] FISHING POLE WITH LINE THROWING ABILITY

[75] Inventor: John M. Chesnut, Grantham, N.H.

[73] Assignee: Lure Launcher Products, LLC, Grantham, N.H.

[21] Appl. No.: 08/961,484

[22] Filed: Oct. 30, 1997

[51] Int. Cl.[6] .......................... A01K 91/02; A01K 91/06
[52] U.S. Cl. ................................. 43/19; 43/41.2
[58] Field of Search .................. 43/19, 41.2, 42.05, 43/43.11, 44.9

[56] References Cited

U.S. PATENT DOCUMENTS

| | | | |
|---|---|---|---|
| 1,124,726 | 1/1915 | Gray . | |
| 2,292,743 | 8/1942 | Cordry | 43/41.2 |
| 2,305,176 | 12/1942 | Littman | 43/19 |
| 2,795,884 | 6/1957 | Wright | 43/19 |
| 2,817,178 | 12/1957 | Keck | 43/19 |
| 3,026,644 | 3/1962 | Raider | 43/19 |
| 3,163,957 | 1/1965 | Barrett | 43/41.2 |
| 3,266,184 | 8/1966 | Brown | 43/19 |
| 3,416,256 | 12/1968 | Blocker | 43/25.2 X |
| 4,209,931 | 7/1980 | Vance | 43/22 |
| 4,610,104 | 9/1986 | Garcia | 43/41.2 |
| 5,491,924 | 2/1996 | Athanasiadis | 43/19 |

OTHER PUBLICATIONS

Jim Gorant, *The Guidless Rod,* Oct. 1997 Popular Mechanics Magazine.

*Primary Examiner*—Robert P. Swiatek
*Attorney, Agent, or Firm*—Michael J. Weins; Jeffrey E. Semprebon

[57] ABSTRACT

A fishing pole which can throw a fishing line connected to a hook. The fishing pole has a handle, to which a flexible rod is attached. The rod has a rod passage, through which the fishing line passes, and has a rod tip and a rod base. A spring seat is affixed with respect to the rod base. A compression spring is mounted on the rod, and engages the spring seat. A line carrier has a guide passage therethrough, which is slidably engageable with the rod, and a spring-bearing surface for engaging the compression spring. The line carrier engages the fishing line and throws the fishing line when the line carrier is propelled from the rod by the compression spring. The line carrier is configured to prevent passage of the hook through the rod passage. Preferably, the line carrier has an enclosure for containing the hook. For certain embodiments, a depth control clip may be attached to the fishing line to allow the user to control the depth of the hook.

27 Claims, 8 Drawing Sheets

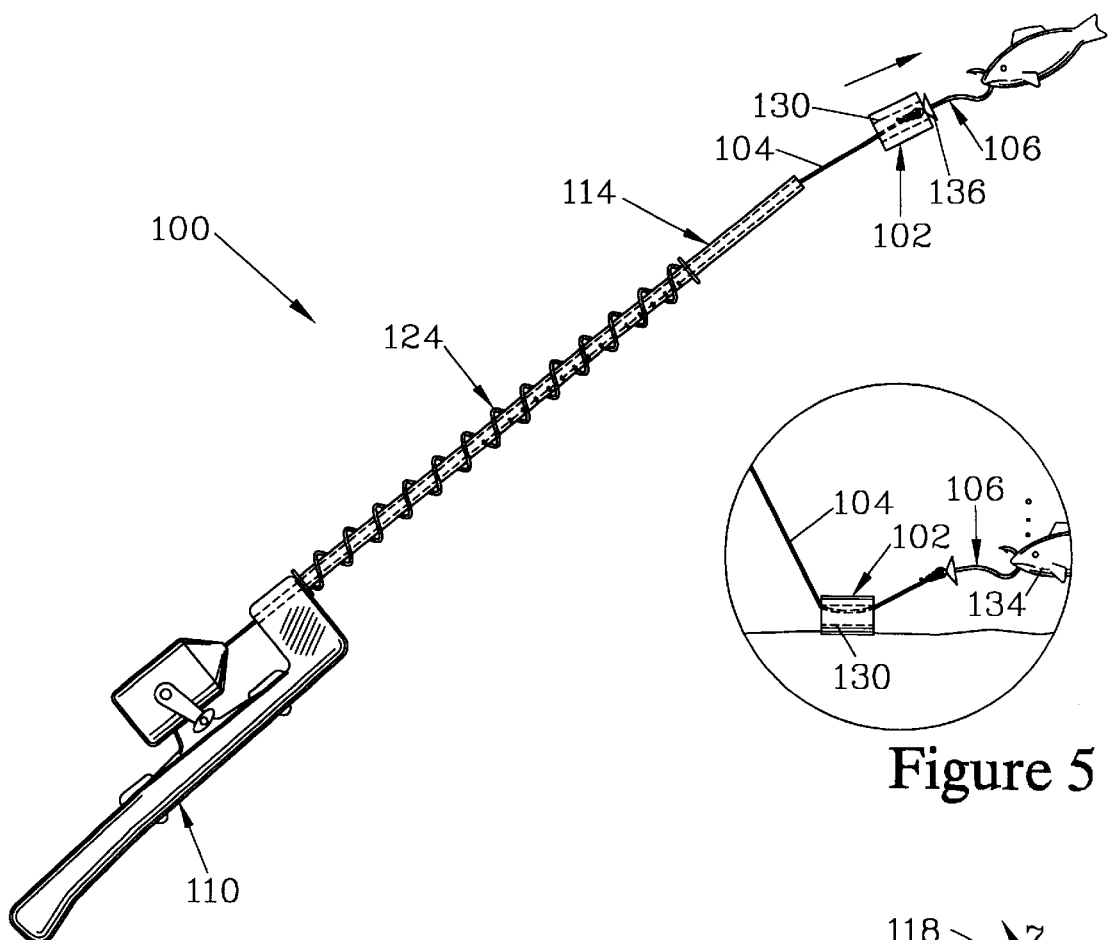
Figure 4
Figure 5
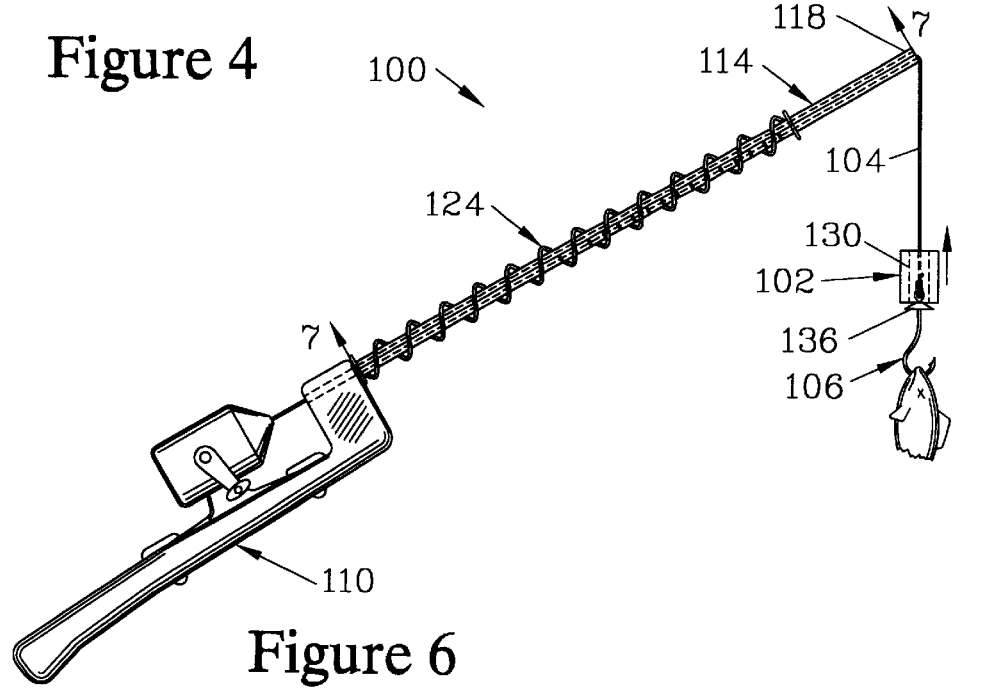
Figure 6

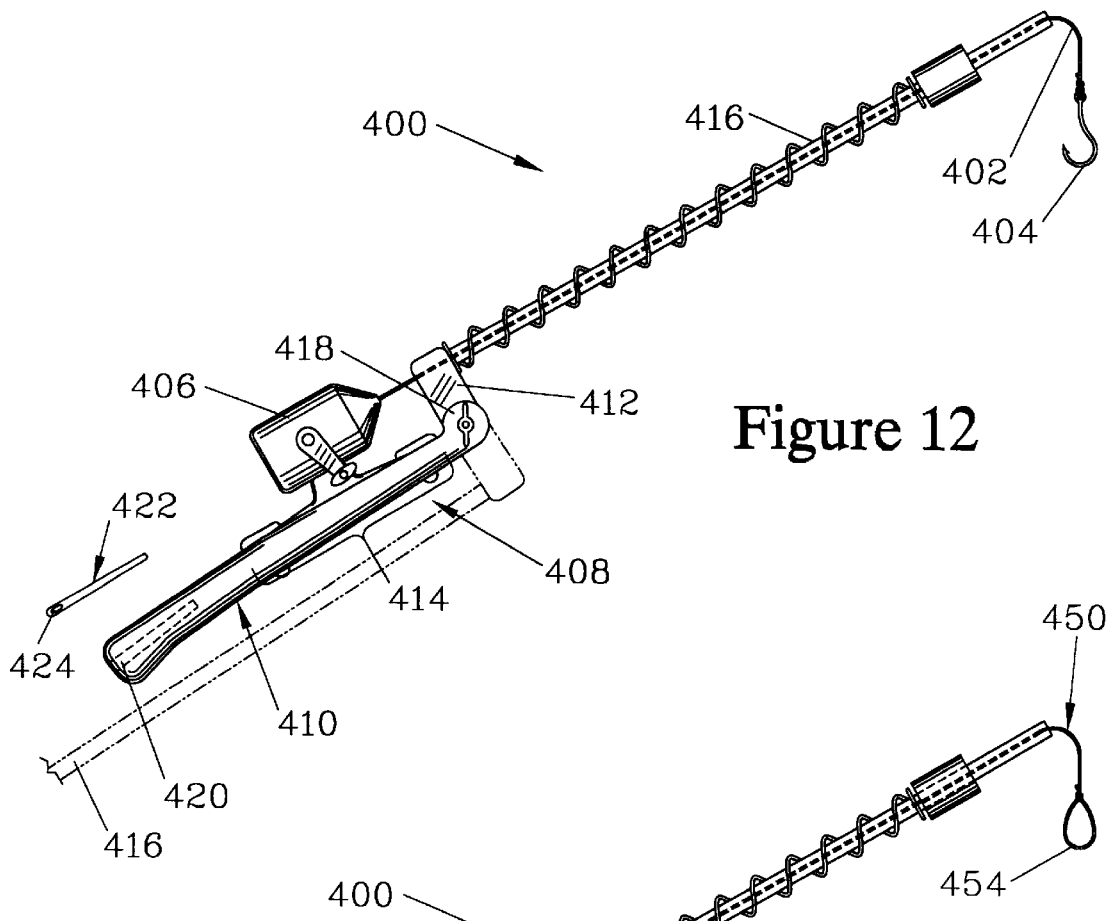
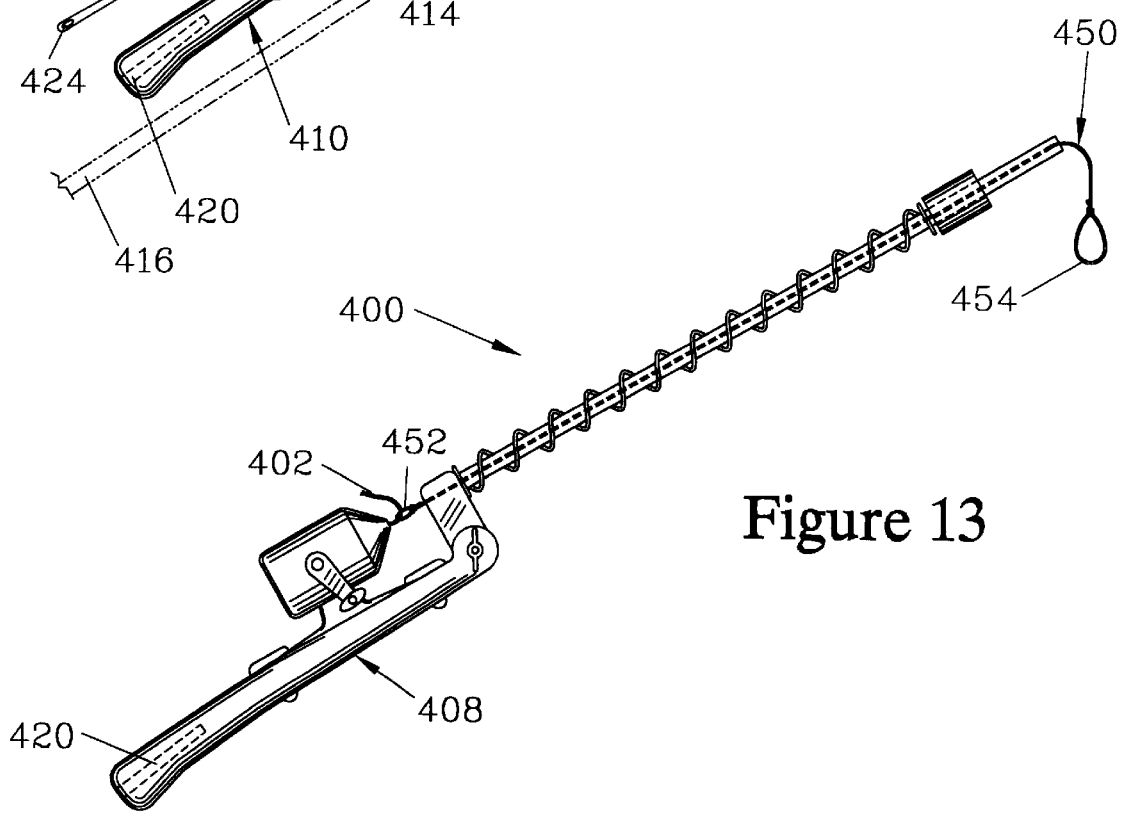

FISHING POLE WITH LINE THROWING ABILITY

FIELD OF THE INVENTION

The present invention is an improved fishing pole which is capable of mechanically throwing a fishing line.

BACKGROUND OF THE INVENTION

There have been a variety of devices for casting lines, which have traditionally been employed for life-saving applications. U.S. Pat. No. 1,124,726 teaches one such device, as well as teaching that it can be attached to a fishing pole in order to throw a weight attached to a fishing line. More recently, line throwing devices designed particularly for attachment to fishing poles have been created. Many of these devices are similar to the '726 device and use the force of a compression spring to drive a piston to throw a weight, which is attached to the fishing line and carries the line with it. U.S. Pat. Nos. 2,305,176; 2,817,178; 3,026,644; 3,266,184; 3,656,252; and 5,491,924 teach such devices.

Alternatively, U.S. Pat. No. 2,795,884 teaches a device using a tension spring which drives a curved finger to throw the weight. In one embodiment, the spring is mounted on the fishing pole, upon which the curved finger slides.

These devices all suffer in that much of the energy of the spring is used to accelerate the piston or finger, and this energy is lost with regard to throwing the fishing line. This energy loss limits the distance which the spring can throw a line for a given stiffness of spring. While throwing distance can be increased by providing a stronger spring, such may prevent operation of the device by children who lack sufficient strength to compress the spring. These devices must also be designed with sufficient structural integrity to decelerate and retain the captive piston or finger, thus increasing the weight and cost of fabrication of the device, and also have complicated structures, making them difficult to fabricate and operate.

Thus, there is a need for a fishline throwing apparatus for angling which does not employ a captive driving element, is simplified in structure, and offers greater ease of operation.

SUMMARY OF THE INVENTION

The present invention is a fishing pole which can throw a fishing line, to which is connected a baited hook, lure, or other terminal fishing device, hereafter referred to simply as a hook. The fishing pole is designed to function in combination with a conventional fishing reel, upon which the fishing line is releasably retained.

The fishing pole has a handle, which has a reel mount thereon. The reel mount is similar to those employed on conventional fishing poles, and allows the fishing reel to be mounted onto the handle.

A flexible rod is provided, having a longitudinal rod axis and an internal axial rod passage therethrough, through which the fishing line passes. The rod has a rod tip and a rod base which attaches to the handle.

A spring seat is provided which is fixably positioned with respect to the rod base. Preferably, the handle is configured to provide the spring seat at the point where the rod base is attached to the handle.

A compression spring is axially aligned with the rod, and is mounted thereon. The compression spring has a base end, which engages the spring seat, and a working end.

A line carrier is provided, having a guide passage therethrough. The guide passage is sized to be slidably engageable with the rod. The line carrier has a spring-bearing surface for engaging the working end of the compression spring, the spring-bearing surface terminating the guide passage.

The line carrier engages the fishing line and serves to throw the fishing line as the line carrier is propelled from the rod by the compression spring. Depending on its specific gravity and configuration, the line carrier may serve as a float, as a sinker, or as a lure.

Means for preventing passage of the hook through the rod passage are provided. When the fishing line is fixably engaged with the line carrier, the line carrier is attached to the hook and the line carrier serves as the means for preventing passage of the hook through the rod passage. As the line is retrieved, the line carrier is drawn up to engage the rod tip, where it blocks the fishing line from being further retracted and prevents the hook from being drawn into the rod.

In other embodiments, the line carrier is slidably engaged with the fishing line and the fishing line is attached directly to the hook. When the guide passage of the line carrier is slidably engaged with the fishing line, the means for preventing passage of the hook through the rod passage may be provided by sizing the guide passage and the hook such that the hook cannot pass through the guide passage. Since the guide passage is necessarily larger than the rod passage, the hook is also unable to pass through the rod passage.

When the line carrier is slidably engaged with the fishing line and is configured to function as a float, it is preferred for the line carrier to have a rear portion, having a rear surface thereon, and an enclosure. The enclosure has a forward opening which allows placing the hook in the enclosure. The hook is contained in the enclosure when the line carrier is thrown, to reduce the chances of snagging. When the fishing line is retracted to retrieve the hook, the hook is drawn into the enclosure of the line carrier, preventing the hook from becoming snagged on weeds or other obstructions.

When the line carrier has an enclosure, the guide passage of the line carrier may slidably engage the fishing line. Again, the means for preventing passage of the hook through the rod passage may be provided by sizing the guide passage and the hook such that the hook cannot pass through the guide passage.

When the guide passage of the line carrier slidably engages the fishing line, a preferred means for preventing passage of the hook through the rod passage is by providing the line carrier with an eyelet. The fishing line passes through the eyelet, which is preferably substantially aligned with the guide passage to minimize friction on the fishing line. The eyelet is sized relative to the hook such that the hook cannot pass through the eyelet. When the line carrier has an enclosure, the eyelet is preferably located in the enclosure.

When an eyelet is provided, a depth control clip may be attached to the fishing line to allow the user to control the depth of the hook. The depth control clip is sized to pass through the rod passage, but is sufficiently large to avoid passing through the eyelet. When the line carrier is thrown and hits the water, and floats thereon, the weight of the hook pulls the line through the eyelet until the depth control clip hits the eyelet. The depth control clip is positioned a distance from the hook equal to the desired depth of the hook.

In another preferred embodiment having an enclosure, the guide passage is offset from the enclosure. The line carrier has a line passage which slidably engages the fishing line. The line passage communicates between the rear surface of the line carrier and the enclosure. This embodiment may also employ a depth control clip, which is sized to pass through the rod passage, but not through the line passage.

In all cases, to assist in pulling the line carrier along the rod towards the rod base to compress the compression spring, it is preferred to have a cocking protrusion on the line carrier. The cocking protrusion extends from the line carrier in a direction substantially normal to the guide passage and is configured to be readily grasped by the hand of a user.

It is preferred for the rod to be provided with indicia positioned along the rod to provide reference to the position of the line carrier with respect to the spring seat when the guide passage is slidably engaged with the rod. The indicia assist the user in determining how far to pull the line carrier to throw it a desired distance.

To provide the best performance for the fishing pole, it is preferred for the rod to be provided with a constant outside diameter D, to minimize friction and binding of the compression spring. It is preferred for the rod passage to have a diameter d which increases as the rod tip is approached. This allows the rod to act similarly to a conventional tapered fishing pole, with decreased stiffness towards the rod tip, while still providing an effective guide for the compression spring.

To prevent breakage of the fishing line, it is preferred for the rod tip to be provided with a tip liner having a rounded opening which terminates the rod passage.

In one preferred embodiment, the handle is designed to allow the fishing pole to be folded for compact storage and transport. The handle of this embodiment has a reel mounting portion, on which the reel mount is provided, and a rod mounting portion, to which the rod is attached. A lockable hinge is connected between the reel mounting portion and the rod mounting portion. The lockable hinge allows folding the handle between a working configuration, where the reel mounting portion of the handle and the rod are in an end-to-end relationship, and a storage configuration, where reel mounting portion of the handle and the rod are in a side-by-side relationship. The lockable hinge allows locking the handle in either the working configuration or the storage configuration.

It is preferred for the handle to have a storage recess therein. The storage recess is configured to conveniently retain means for threading the fishing line through the rod passage.

Preferably, the fishing pole is provided with means for maintaining the compression spring engaged with the spring seat, to prevent the compression spring from being accidentally propelled off of the rod when the line carrier is thrown. It is preferred for the means for maintaining the compression spring engaged with the spring seat to allow for replacing the compression spring.

Several features of the preferred the line carrier configurations discussed above may be incorporated into an independent float system for use with a conventional fishing pole. Such an improved float system provides the ability to control the maximum depth of the hook, as well as providing improved action of the hook, while reducing the possibility of snagging.

BRIEF DESCRIPTION OF THE FIGURES

FIG. 4 is a side view of the embodiment shown in FIG. 3, showing the line carrier after it has been released.

FIG. 5 is a detail view showing the line carrier of FIGS. 3 and 4 after it has been thrown and has sunk to the bottom of a body of water.

FIG. 6 is a side view of the embodiment shown in FIGS. 3 and 4, where the hook is being retrieved.

FIG. 12 is a side view illustrating another embodiment of the present invention, a fishing pole which may be folded for compact storage or transport. The handle of this embodiment has a reel mounting portion and a rod mounting portion, with a lockable hinge connected therebetween. The reel mounting portion and the rod mounting portion may be pivoted between a working configuration and a storage configuration, shown in phantom. The handle of this embodiment also has a storage recess which retains a threading weight which provides means for threading the fishing line through the rod passage.

FIG. 13 illustrates a threading line which can be used in place of the threading weight shown in FIG. 12 to provide means for threading the fishing line through the rod passage.

BEST MODE FOR CARRYING THE INVENTION INTO PRACTICE

Figure 1:
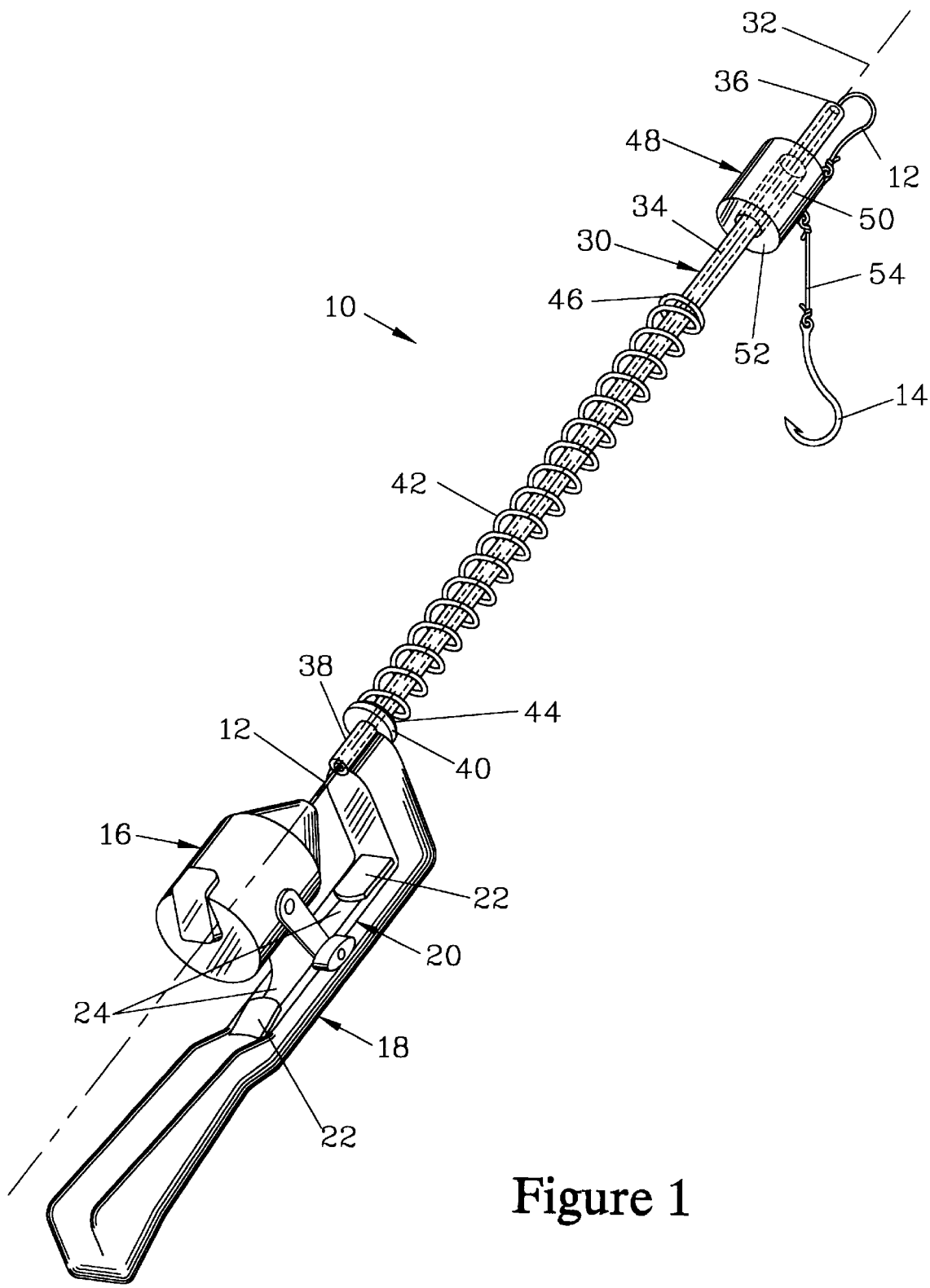
FIG. 1 is a view illustrating one embodiment of the present invention. A fishing pole has a handle with a reel mount, a rod attached to the handle through which a fishing line passes, a compression spring positioned on the rod, and a line carrier which is slidably engagable with the rod. In this embodiment, the line carrier is fixably engaged with the fishing line, and a hook is in turn attached to the line carrier.

FIG. 1 is a view illustrating one embodiment of the present invention, a fishing pole 10. The fishing pole 10 can throw a fishing line 12 which is connected to a hook 14. The fishing line 12 is retained on a fishing reel 16 in the manner well known in the art. It is preferred for the fishing reel 16 to be a spin-cast reel for ease of operation and to avoid problems with backlash. While the hook 14 illustrated is a simple fish-hook, it should be appreciated that the hook 14 could include any of the various terminal fishing devices known in the art, such as weighted hooks, treble hooks, artificial lures, etc.

The fishing pole 10 has a handle 18, which is configured to be grasped by the user. The handle 18 has a reel mount 20, which allows the fishing reel 16 to be mounted onto the handle 18. The reel mount 20 may be any conventional mounting used for mounting fishing reels to fishing poles. In the fishing pole 10 illustrated, the reel mount 20 has two reel mounting brackets 22. The fishing reel 16 has two mounting tabs 24, which are secured to the handle 18 by the reel mounting brackets 22.

A flexible rod 30 is provided, having a longitudinal rod axis 32. The rod 30 has an internal axial rod passage 34 therethrough, through which the fishing line 12 passes. The rod 30 has a rod tip 36 and a rod base 38. The rod base 38 attaches to the handle 18.

A spring seat 40 is fixably positioned with respect to the rod base 38. In the fishing pole 10, the spring seat 40 is positioned at the point where the rod base 38 attaches to the handle 18.

A compression spring 42 is axially aligned with the rod 30, and is mounted thereon. The compression spring 42 has a base end 44 and a working end 46. The base end 44 of the compression spring 42 engages the spring seat 40. The compression spring 42 may be a progressively wound compression spring, such that the spring constant increases with increasing compression.

In order to enable the user of the fishing pole 10 to readily throw or cast the fishing line 12 to a desired location, a line carrier 48 is provided. The line carrier 48 engages the fishing line 12 and has a guide passage 50, which is sized to be slidably engageable with the rod 30. The line carrier 48 also has a spring-bearing surface 52 for engaging the working end 46 of the compression spring 42. The spring-bearing surface 52 terminates the guide passage 50.

In the fishing pole 10, the line carrier 48 fixably engages the fishing line 12. The line carrier 48 is attached to the hook 14, and the hook 14 is connected to the fishing line 12 via the line carrier 48. It is typically preferred for the hook 14 to be attached to the line carrier 48 with a leader 54.

Since the line carrier 48 is fixably engaged with the fishing line 12, means for preventing passage of the hook 14 through the rod passage 34 are provided by the line carrier 48. When the fishing line 12 is retracted, the line carrier 48 is drawn up until it engages the rod tip 36, and blocks the fishing line 12 from being further retracted. Thus, the hook 14, which is attached to the line carrier 48 by the leader 54, is prevented from passing through the rod passage 34.

The line carrier 48 is frequently designed to function either as a float or as a sinker. If the line carrier 48 is constructed with an overall specific gravity greater than that of water, it functions as a sinker when thrown. This is typically advantageous for use with live bait on the hook 14, in order to hold the bait near the bottom of a body of water to attract benthic-feeding fish, and the leader 54 is of sufficient length to allow the live bait to swim about freely near the bottom. If the line carrier has an overall specific gravity less than that of water, it acts as a float or bobber. In this case, the line carrier 48 is constructed to provide sufficient buoyancy to support the hook 14 in addition to its own weight, and the leader 54 is of sufficient length to allow the hook 14 to sink to the desired depth where fish are expected to be feeding, while the line carrier 48 remains on the surface.

To use the fishing pole 10, the guide passage 50 of the line carrier 48 is slidably engaged with the rod tip 36, and the line carrier 48 is moved along the rod 30 towards the rod base 38. Moving the line carrier 48 towards the rod base 38 brings the spring-bearing surface 52 of the line carrier 48 into engagement with the working end 46 of the compression spring 42. As the line carrier 48 is moved further towards the rod base 38, the compression spring 42 is increasingly compressed between the spring-bearing surface 52 of the line carrier 48 and the spring seat 40, which is affixed with respect to the rod base 38. The line carrier 48 is manually moved back by the user a desired amount, thereby determining the force of the compression spring 42. The amount of force of the compression spring 42 determines how far the line carrier 48 will be thrown. Moving the line carrier 48 further towards the rod base 38 results in the line carrier 48 being thrown further when released.

When the line carrier 48 has been moved towards the rod base 38 to achieve the desired force on the compression spring 42, the user adjusts the fishing reel 16 to allow the fishing line 12 to be freely released therefrom and releases the line carrier 48. When the line carrier 48 is released, the compression spring 42 expands forcibly, and propels the line carrier 48 via the engagement of the working end 46 with the spring-bearing surface 52. The expansion of the compression spring 42 throws the line carrier 48 forward off the rod 30.

Because the fishing line 12 and the hook 14 are attached to the line carrier 48, the fishing line 12 and the hook 14 are carried with the line carrier 48 when it is thrown. When the fishing line 28 is retrieved, the line carrier 48 is drawn up until it engages the rod tip 36. The line carrier 48 may then be slidably engaged with the rod 30 to be thrown again.

Figure 2:
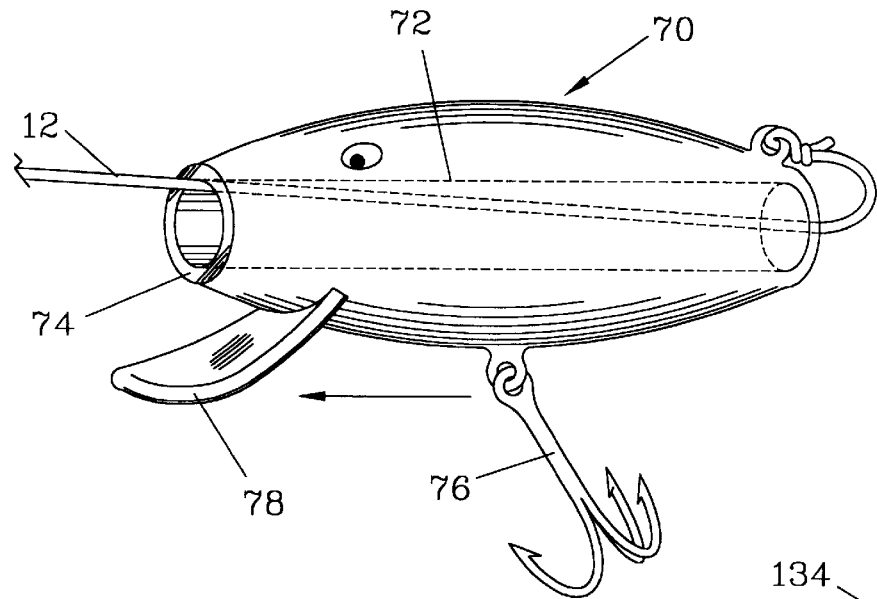
FIG. 2 is a view illustrating an alternative line carrier which may be employed with the fishing pole shown in FIG. 1. The line carrier of this embodiment is shaped to function as a lure when retrieved.

FIG. 2 illustrates a line carrier 70 which may be employed with the fishing pole 10 shown in FIG. 1. The line carrier 70 is shaped to function as a lure when it is retrieved.

The line carrier 70 again is fixably engaged with the fishing line 12 and has a guide passage 72 therethrough. The guide passage 72 is sized to be slidably engageable with the rod 30 (shown in FIG. 1). The line carrier 70 has a spring-bearing surface 74 which terminates the guide passage 72. A hook 76 is attached directly to the line carrier 70.

The line carrier 70 also has a blade 78 which is preferably positioned near the spring-bearing surface 74. In the line carrier 70, the fishing line 12 passes through the guide passage 72 such that, when the fishing line 12 is retracted, the line carrier 70 will be pulled through the water in the direction indicated. Resistance of the blade 78 to passage through the water causes the line carrier 70 to wobble in a manner which simulates the movement of a wounded fish. The blade 78 provides an additional benefit in providing a convenient grip for the user when preparing to throw the line carrier 70. The blade 78 may be grasped by the user to facilitate pulling the line carrier 70 along the rod 30 without accidentally gripping the hook 76.

Figure 3:
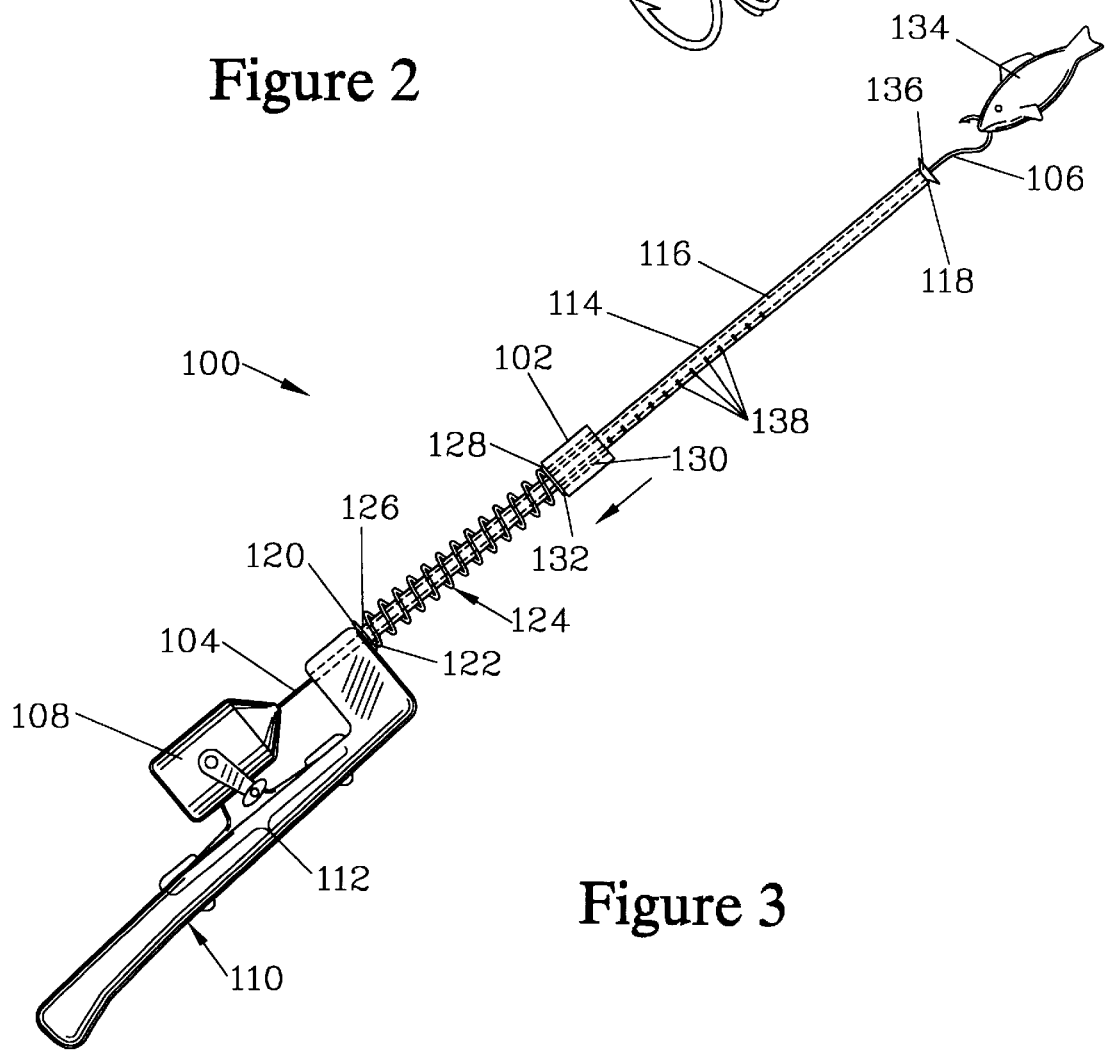
FIG. 3 is a side view of a fishing pole which forms another embodiment of the present invention. The line carrier of this embodiment slidably engages a fishing line, which is attached to a hook. The fishing pole is shown where the line carrier is pulled back prior to being thrown.

FIG. 3 is a side view of another embodiment of the present invention, a fishing pole 100. The fishing pole 100 differs from the fishing pole 10 shown in FIG. 1 in that it employs a line carrier 102 which slidably engages a fishing line 104. The fishing line 104 is attached directly to a hook 106. Again, the fishing line 104 is retained on a fishing reel 108.

The fishing pole 100 has a handle 110, which has a reel mount 112 thereon, which allows the fishing reel 108 to be mounted onto the handle 110.

The fishing pole 100 has a flexible rod 114, having an internal axial rod passage 116 therethrough, through which the fishing line 104 passes. The rod 114 has a rod tip 118 and a rod base 120 which is attached to the handle 110.

A spring seat 122 is fixably positioned with respect to the rod base 120. In the fishing pole 100, the handle 110 is configured to provide the spring seat 122.

A compression spring 124 is axially aligned with and mounted on the rod 114. The compression spring 124 has a base end 126, which engages the spring seat 122, and a working end 128.

The line carrier 102 has a guide passage 130 therethrough. The guide passage 130 is sized to be slidably engageable with the rod 114, and is terminated by a spring-bearing surface 132. In the fishing pole 100, the guide passage 130 of the line carrier 102 slidably engages the fishing line 104.

The line carrier 102 illustrated has a specific gravity significantly greater than that of water, causing it to function as a sinker. Such a configuration of the line carrier 102 is especially well suited to fishing with a live bait 134.

The hook 106 employed with the fishing pole 100 is sized greater in diameter than the guide passage 130. In this embodiment, the sizing of the hook 106 is accomplished by providing a washer 136 on the hook 106. Since the guide passage 130 is necessarily larger than the rod passage 116, sizing the hook 106 greater in diameter than the guide passage 130 also results in the hook 106 being unable to pass through the rod passage 116. Thus, the size of the hook 106 relative to the guide passage 130 provides means for preventing passage of the hook 106 through the rod passage 116.

FIG. 3 shows the fishing pole 100 when the line carrier 102 is pulled in the direction indicated towards the rod base 120 prior to being thrown. The rod 114 is preferably provided with indicia 138, positioned along the rod 114. The indicia 138 provide a reference as to the position of the line carrier 102 with respect to the spring seat 122 to assist the user in determining how far to pull the line carrier 102 towards the rod base 120 to throw the line carrier 102 a desired distance.

FIG. 4 shows the fishing pole 100 after the line carrier 102 has been released. The force of the compression spring 124 propels the line carrier 102 forward off of the rod 114. Because the size of the hook 106 prevents passage of the hook 106 through the guide passage 130, the hook 106 and attached fishing line 104 are carried with the line carrier 102.

FIG. 5 is a detail view showing the line carrier 102 and hook 106 after they have sunk to the bottom of a body of water. The line carrier 102 functions as a sinker and rests on the bottom. Since the fishing line 104 is not attached to the line carrier 102, but rather is slidably engaged with the guide passage 130, the fishing line 104 may pass freely therethrough, allowing the live bait 134 to swim freely to attract fish which feed near the bottom.

FIG. 6 shows the fishing pole 100 where the hook 106 is being retrieved. As the fishing line 104 is retracted, the washer 136 on the hook 106 is drawn into engagement with the line carrier 102. Since the size of the washer 136 prevents passage of the hook 106 through the guide passage 130, the line carrier 102 is retrieved along with the hook 106. Because the fishing line 104 is slidably engaged with the guide passage 130, the guide passage 130 is drawn up to the rod tip 118 when the fishing line 104 is retracted. Frequently, the line carrier 102 is pulled onto the rod tip 118, where it is again ready for use.

Figure 7:
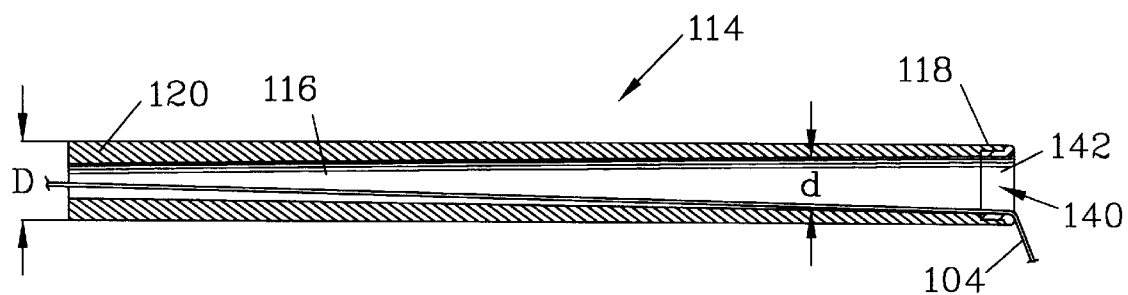
FIG. 7 is a view of the section 7—7 of FIG. 6, showing additional details of the rod passage.

FIG. 7 is a view of the section 7—7 of FIG. 6, showing additional details of the rod passage 116 of the fishing pole 100. To minimize friction and binding of the compression spring 124 (shown in FIG. 6) with the rod 114, it is preferred for the rod 114 to be provided with an outside diameter D which is constant over the length of the rod 114. However, for best angling performance, it is desirable for the rod 114 to decrease in rigidity as the rod tip 118 is approached. To accomplish both these objectives, it is preferred for the rod passage 116 to have a diameter d which increases as the rod tip 118 is approached. This allows the rod 114 to act similarly to a conventional tapered fishing pole, with decreased stiffness towards the rod tip 118, while still providing an effective guide for the compression spring 124.

To eliminate sharp edges which might result in breaking the fishing line 104, a tip liner 140 is preferably provided in the rod tip 118. The tip liner 140 has a rounded-off opening 142 which terminates the rod passage 116. The tip liner 140 is preferably constructed from a durable low-friction material, such as silicon carbide or aluminum oxide, such as is used for line guides on conventional fishing poles.

Figure 8:
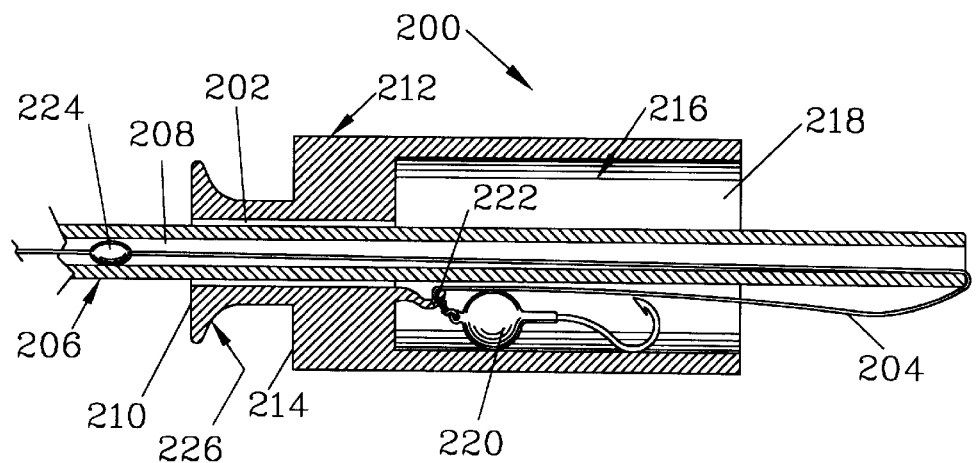
FIG. 8 is a section view illustrating another line carrier which slidably engages the fishing line and may be employed with a fishing pole similar to that shown in FIGS. 3–7. The line carrier has a rear portion and an enclosure for containing the hook. An eyelet in the enclosure allows the use of a depth control clip to control the maximum depth of the hook. The line carrier is shown slidably engaged with the rod.

FIG. 8 is a section view of a line carrier 200 which may be employed with a fishing pole such as the fishing pole 100 shown in FIGS. 3–7 to provide additional benefits. The line carrier 200 has a guide passage 202 therethrough which slidably engages a fishing line 204. The guide passage 202 is sized to be slidably engageable with a rod 206 having a rod passage 208. The line carrier 200 also has a spring-bearing surface 210 which terminates the guide passage 202. The line carrier 200 has an overall specific gravity less than that of water, causing the line carrier 200 to function as a float or bobber.

The line carrier 200 of this embodiment is formed with a rear portion 212, having a rear surface 214, and an enclosure 216 which extends forward from the rear portion 212. The enclosure 216 has a forward opening 218, which allows placing a hook 220 in the enclosure 216. The hook 220 is contained in the enclosure 216 when the line carrier 200 is thrown, to reduce the chances of snagging the hook 220 on nearby objects. In this embodiment, the guide passage 202 is provided through the rear portion 212.

The guide passage 202 of the line carrier 200 slidably engages the fishing line 204, and the fishing line 204 is directly attached to the hook 220. Since the line carrier 200 is slidably engaged with the fishing line 204, the hook 220 is drawn into the enclosure 216 when the fishing line 204 is retracted. The hook 220 is thus contained in the enclosure 216 as it is retrieved, preventing the hook 220 from becoming snagged on weeds or other obstructions during retrieval.

Preferably, the line carrier 200 is provided with an eyelet 222 through which the fishing line 204 passes. The eyelet 222 is sized smaller in diameter than the size of the hook 220, which prevents passage of the hook 220 through the eyelet 222. Thus, the eyelet 222 provides means for preventing passage of the hook 220 through the rod passage 208. The eyelet 222 is preferably substantially aligned with the guide passage 202 to minimize friction on the fishing line 204 as it passes therethrough. In the line carrier 200, the eyelet 222 resides in the enclosure 216. In this embodiment, the eyelet 222 is not exactly aligned with the guide passage 202, but rather is offset to allow sliding the line carrier 200 onto the rod 206.

In addition to providing means for preventing passage of the hook 220 through the rod passage 208, the eyelet 222 allows the user to control the depth of the hook 220 when thrown. A depth control clip 224 is attached to the fishing line 204 in a spaced apart relationship to the hook 220. The depth control clip 224 is sized to pass through the rod passage 208 and the guide passage 202, but is sized larger than the diameter of the eyelet 222, and thus cannot pass therethrough.

Figure 9:
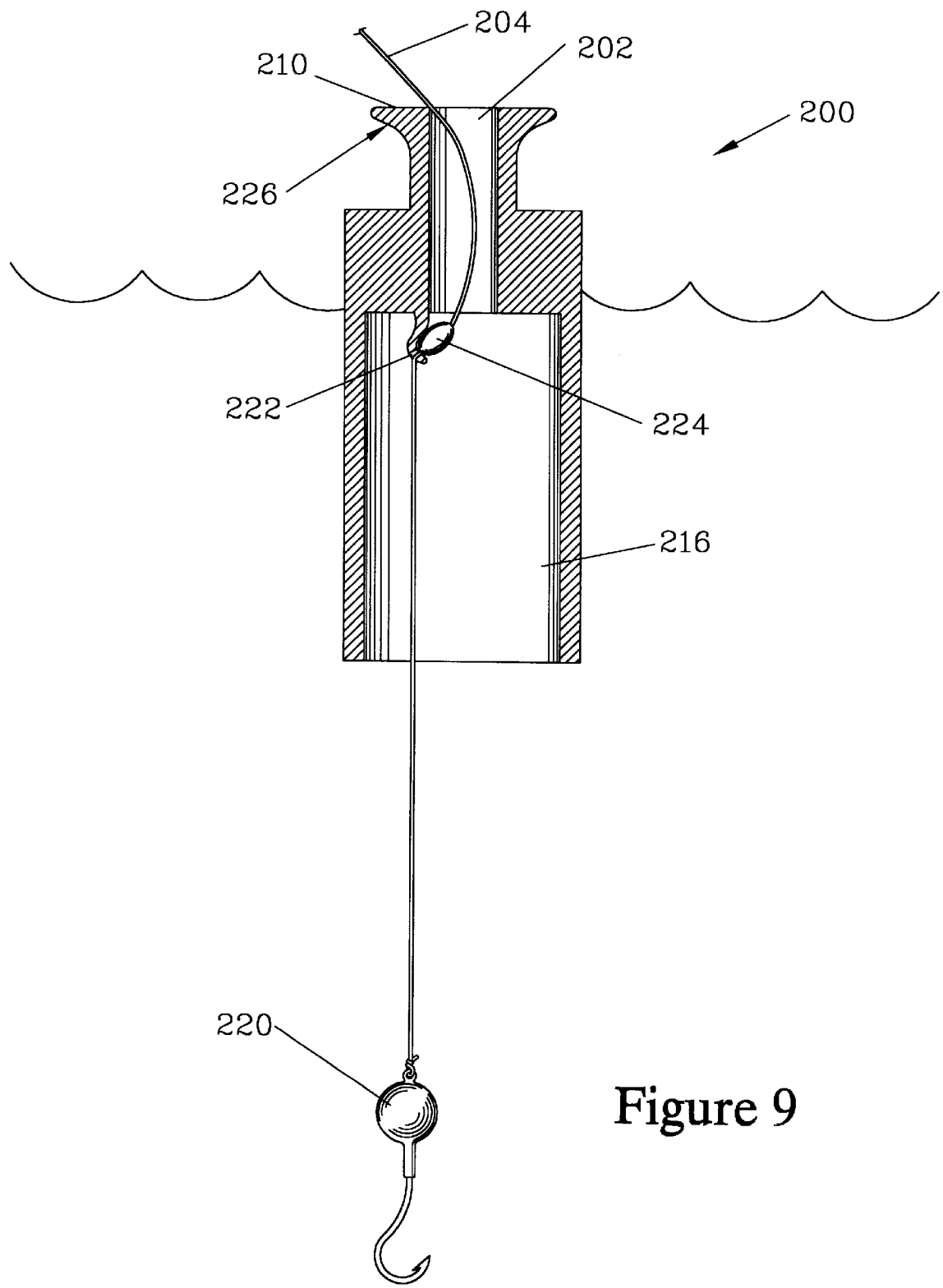
FIG. 9 illustrates the line carrier shown in FIG. 8 after it has been thrown. The line carrier floats, and the hook has sunk until the depth control clip has engaged the eyelet.

As shown in FIG. 9, when the line carrier 200 is thrown and hits the water, it floats. The weight of the hook 220 causes the hook 220 to sink, and as it sinks it pulls the fishing line 204 through the eyelet 222 until the depth control clip 224 hits the eyelet 222. Since the depth control clip 224 is too large to pass through the eyelet 222, the sinking of the hook 220 is stopped and it is suspended at the desired depth.

Whether or not an eyelet is provided, the enclosure 216 provides a vertical sinking action of the hook 220. This vertical action is felt to provide a more natural appearance to fish than the swinging decent of a weighted hook cast with a conventional fishing pole.

Since the fishing line 204 is slidably engaged with the line carrier 200 and passes freely through the eyelet 222 and guide passage 202, the user may "jig" the hook 220 by jerking the fishing line 204, causing the hook 220 to ascend and descend rapidly to attract fish. This jerking action gradually pulls the line carrier 200 across the water surface towards the user. Thus, the hook 220 follows a path through the water to attract any fish along the path.

It is preferred for the line carrier 200 to have a cocking protrusion 226. The cocking protrusion 226 extends from the line carrier 200 in a direction substantially normal to the guide passage 202, and is configured to be readily grasped by the hand of a user. The cocking protrusion 226 allows the user to conveniently grip the line carrier 200 to facilitate pulling the line carrier 200 along the rod 206 against the force of a compression spring (not shown). In the line carrier 200, the cocking protrusion 226 is configured to also provide the spring-bearing surface 210.

While the line carrier 200 provides several benefits, there is a possibility of the hook 220 becoming jammed against the rod 206 when the line carrier 200 is pulled back and released. This may particularly be a problem when the hook 220 is baited with an artificial lure of an elastic material, such as an imitation worm or minnow.

Figure 10:
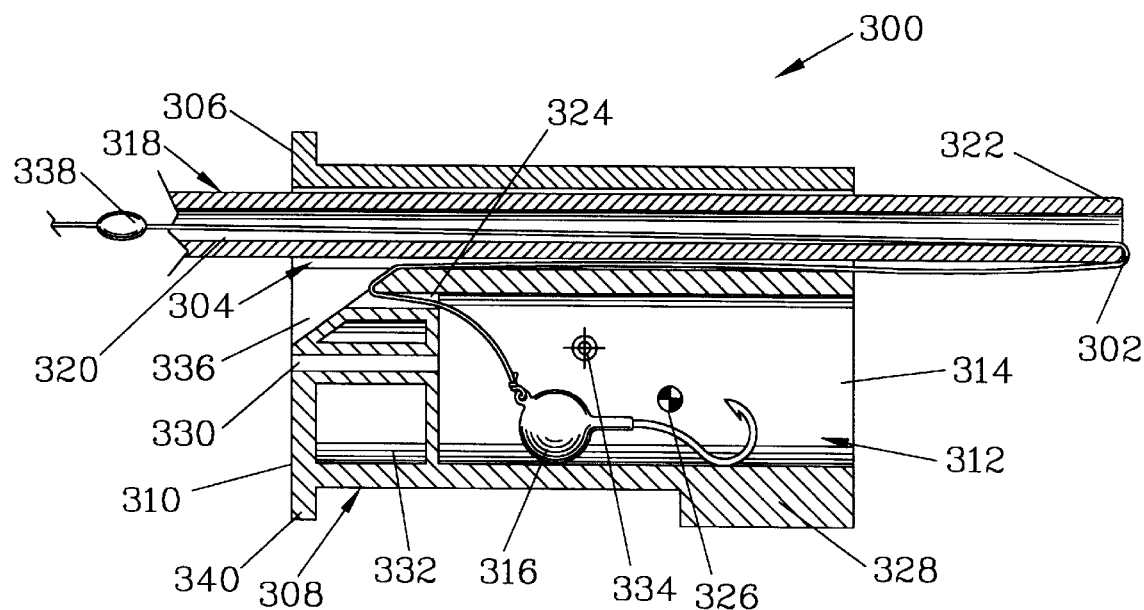
FIG. 10 is a section view illustrating another line carrier, which provides improved throwing characteristics. The line carrier of this embodiment has a guide passage which is offset from an enclosure, and has a line passage which slidably engages the fishing line.
Figure 11:
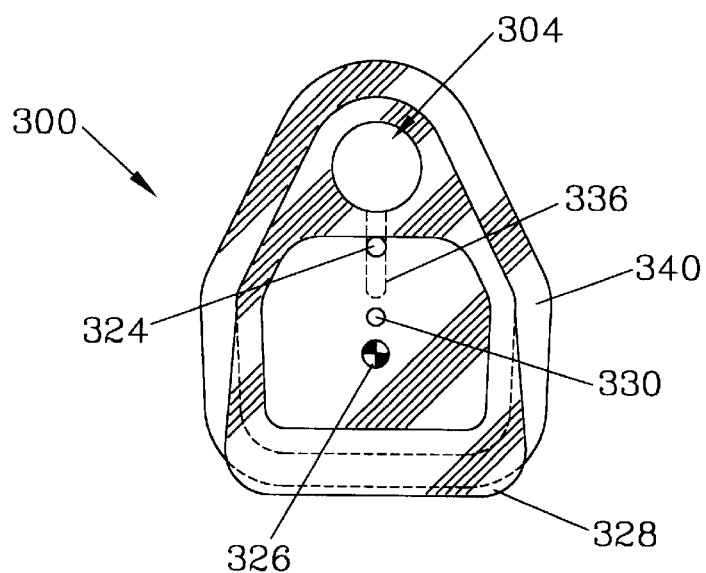
FIG. 11 is an end view illustrating further details of the line carrier shown in FIG. 10.

FIGS. 10 and 11 illustrate a line carrier 300 which provides the benefits of the line carrier 200, but which overcomes the jamming problem while also providing improved throwing characteristics. The line carrier 300 again slidably engages a fishing line 302, and has a guide passage 304 therethrough. The line carrier 300 has a spring-bearing surface 306, which terminates the guide passage 304.

The line carrier 300 again has a rear portion 308, having a rear surface 310 thereon. The line carrier has an enclosure 312 which extends from the rear portion and has a forward opening 314. The forward opening 314 allows placing a hook 316 into the enclosure 312. The guide passage 304 of the line carrier 300 is offset from the enclosure 312. Thus, when the guide passage 304 is slidably engaged with a rod 318, there is no contact between the hook 316 and the rod 318, eliminating any problems due to jamming. The rod 318 again has an internal rod passage 320 and a rod tip 322.

The line carrier 300 of this embodiment is provided with a line passage 324 which communicates between the rear surface 310 and the enclosure 312. The line passage 324 slidably engages the fishing line 302. The line passage 324 is sized such that the hook 316 cannot pass through the line passage 324. Thus, the line passage 324 provides means for preventing passage of the hook 316 through the rod passage 320.

In addition to preventing jamming, offsetting the guide passage 304 from the enclosure 312 provides greater stability for the line carrier 300 when it is thrown. Because of this offset, the line carrier 300 has a center of mass 326 which is substantially displaced from the guide passage 304 (as best shown in FIG. 11). Such a position of the center of mass 326 stabilizes the line carrier 300 when the guide passage 304 is slidably engaged with the rod 318, since the force of gravity maintains the line carrier 300 positioned with the center of mass 326 below the guide passage 304. Thus, the line carrier 300 is stabilized against any twisting forces imparted on it by a compression spring (not shown) when the line carrier 300 is thrown. Such stability minimizes twisting of the fishing line 302 when the line carrier 300 is thrown.

It is preferred for a weight 328 to be provided adjacent the forward opening 314. In the line carrier 300, the weight 328 is integral to the enclosure 312 to facilitate fabrication of the line carrier 300 by molding. When the line carrier 300 is thrown and hits the water, the weight 328 sinks rapidly, causing the line carrier 300 to tip to a substantially vertical orientation to allow the hook 316 to drop from the enclosure 312 through the forward opening 314.

To prevent air trapped in the enclosure 312 from preventing rapid sinking of the weight 328, it is preferred to provide an air bleed vent 330 which communicates with the enclosure 312. In the line carrier 300, the air bleed vent 330 is provided through the rear portion 308. When the line carrier 300 is constructed from a dense material, such as molded plastic, it may be necessary for the rear portion 308 to be formed with an air chamber 332 to assure that the line carrier 300 has sufficient buoyancy to support the hook 316.

The weight 328 also improves aerodynamic stability of the line carrier 300. The position of the weight 328 adjacent to the forward opening 314 moves the center of mass 326 further forward from the rear portion 306 (as best shown in FIG. 10), while having little effect on a center of pressure 334. Moving the center of mass 326 further forward relative to the center of pressure 334 increases the aerodynamic stability of the line carrier 300, thus minimizing any tumbling of the line carrier 300 when thrown. This increases the distance that the line carrier 300 may be thrown, and decreases the possibility of twisting or tangling the fishing line 302. The weight 328 is preferably also positioned opposite to the guide passage 304, which moves the center of mass 326 further away from the guide passage 304.

It is preferred for the line passage 324 to be substantially aligned with the guide passage 304 to minimize friction of the fishing line 302. It is also preferred for the line passage 324 to communicate with the guide passage 304 to cause the guide passage 304 to be drawn up to the rod tip 322 when the line carrier 300 is retrieved. In the line carrier 300, both of these objectives are accomplished by providing the guide passage 304 with a ramp 336 which extends to the rear surface 310. The line passage 324 extends from the enclosure 312 to the ramp 336, and communicates with the rear surface 310 via the ramp 336. The ramp 336 allows the line passage 324 to communicate with the guide passage 304 without significantly diminishing the area of the spring-bearing surface 306.

A depth control clip 338 which is sized to pass through the rod passage 320 of the rod 318 but not through the line passage 324 may be used to control the depth of the hook 316 in the manner discussed above with respect to the line carrier 200 shown in FIGS. 8 and 9.

It is again preferred for the line carrier 300 to have a cocking protrusion 340. The cocking protrusion 340 extends from the line carrier 300 in a direction substantially normal to the guide passage 304, to facilitate pulling the line carrier 300 along the rod 318 against the force of the compression spring.

FIG. 12 illustrates another embodiment of the present invention, a fishing pole 400 which may be folded for compact storage or transport. Again, the fishing pole 400 employs a fishing line 402 which is attached to a hook 404, the fishing line 402 being retained on a fishing reel 406.

The fishing pole 400 has a handle 408 having a reel mounting portion 410 and a rod mounting portion 412. The reel mounting portion 410 is configured to be grasped and has a reel mount 414 thereon, to which the fishing reel 406 is mounted. The rod mounting portion 412 has a flexible rod 416 attached thereto. The rod 416 again has a rod passage (not shown) therethrough.

A lockable hinge 418 is connected between the reel mounting portion 410 and the rod mounting portion 412. The lockable hinge 418 allows the reel mounting portion 410 and the rod mounting portion 412 to be pivoted with respect to each other between a working configuration, where the reel mounting portion 410 of the handle 408 and the rod 416 are in an end-to-end relationship, and a storage configuration (shown in phantom), where reel mounting portion 410 and the rod 416 are in a side-by-side relationship. The lockable hinge 418 allows locking the handle 408 in either the working configuration or the storage configuration. The lockable hinge 418 is locked to affix the reel mounting portion 410 and the rod mounting portion 412 with respect to each other, and is unlocked to allow the reel mounting portion 410 and the rod mounting portion 412 to be pivoted between the working configuration and the storage configuration.

In addition to the benefit of being foldable, the handle 408 is advantageously provided with a storage recess 420 which is configured to retain means for threading the fishing line 402 through the rod passage. As shown in FIG. 12, a threading weight 422 may provide the means for threading the fishing line 402 through the rod passage. The threading weight 422 has a threading eyelet 424 to which the fishing line 402 may be attached, and is sized to pass through the rod passage. The fishing line 402 is attached to the threading eyelet 424 of the threading weight 422, and the handle 408 is held such that the rod 416 is substantially vertical. The threading weight 422 is then dropped through the rod passage, and the fishing line 402 is detached from the threading weight 422 and attached to the hook 404. After use, the threading weight 422 is inserted into the storage recess 420 for storage.

FIG. 13 illustrates a threading line 450 which alternatively may provide the means for threading the fishing line 402 through the rod passage. The threading line 450 is preferably constructed of a resilient material such as thick monofilament fish-line, and terminates in a threading loop 452 and a gripping region 454. To thread the fishing line 402 through the rod passage, the threading loop 452 of the threading line 450 is inserted into the rod passage and advanced therethrough, such that the threading loop 452 emerges at the handle 408. The fishing line 402 is then passed through the threading loop 452, and the threading loop 452 is pulled back through the rod passage, bringing the fishing line 402 through the rod passage. The fishing line 402 is then attached to the hook 404. The threading line 450 may be folded after use and placed in the storage recess 420 in the handle 408 for storage.

For all the fishing poles discussed above, it is preferred to provide means for maintaining the compression spring engaged with the spring seat. Such means prevent the compression spring from being accidentally propelled off of the rod when the line carrier is thrown. While such can be provided by affixing the base end of the compression spring to the spring seat, it is preferred for the means for maintaining the compression spring engaged with the spring seat to allow for replacing the compression spring. Such means allow the compression spring to be readily replaced if damaged or worn, and also allow interchanging the compression spring with a different compression spring to vary the throwing characteristics of the fishing pole.

Figure 14:
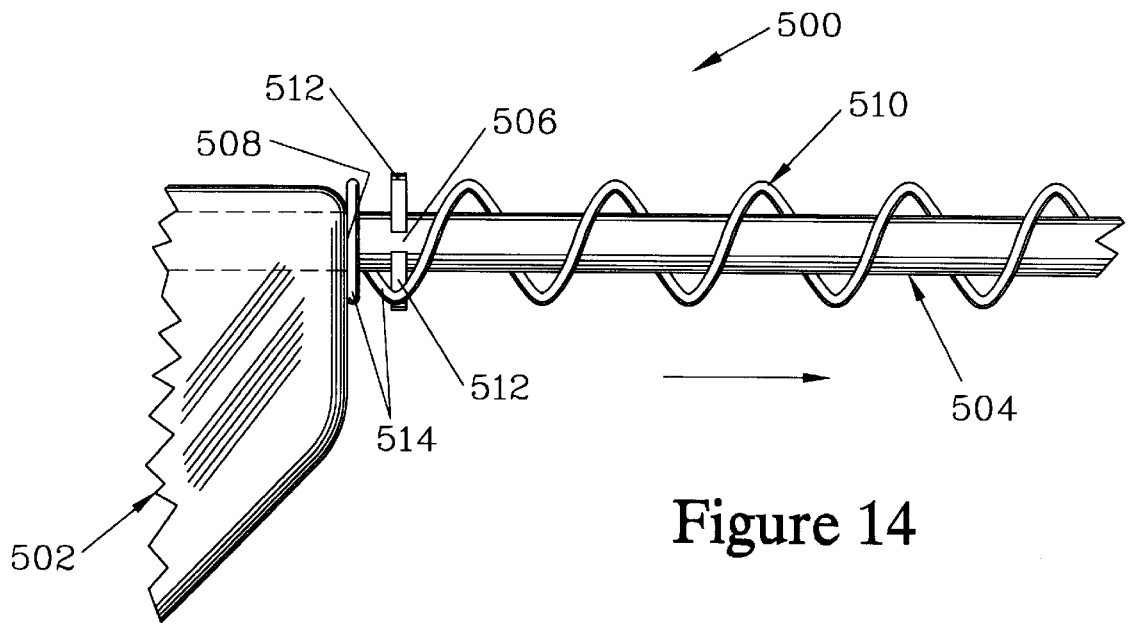
FIG. 14 is a detail view illustrating spring seat lugs which provide means for maintaining a compression spring engaged with a spring seat.

FIG. 14 is a detail view illustrating a portion of a fishing pole 500. The fishing pole 500 has a handle 502, to which a flexible rod 504 is attached. The rod 504 has a rod base 506, and a spring seat 508 is provided on the handle 502 so as to be fixably positioned with respect to the rod base 506. A compression spring 510 is axially aligned with and mounted on the rod 504.

The fishing pole 500 is provided with spring-retaining lugs 512, which project substantially normal to the rod 504. The spring-retaining lugs 512 provide means for maintaining the compression spring 510 engaged with the spring seat 508. In the fishing pole 500, the spring-retaining lugs 512 are provided on the rod base 506.

Coils 514 of the compression spring 510 may be looped over the spring-retaining lugs 512. When the compression spring 510 is compressed and released, the momentum of the compression spring 510 will act to move it in the direction indicated. The coils 514 which are looped over the spring-retaining lugs 512 prevent the compression spring 510 from moving away from the spring seat 508.

If it is desired to replace the compression spring 510, it may readily be removed from engagement with the spring se at 508 by unlooping the coils 514 from the spring-retaining lugs 512.

Figure 15:
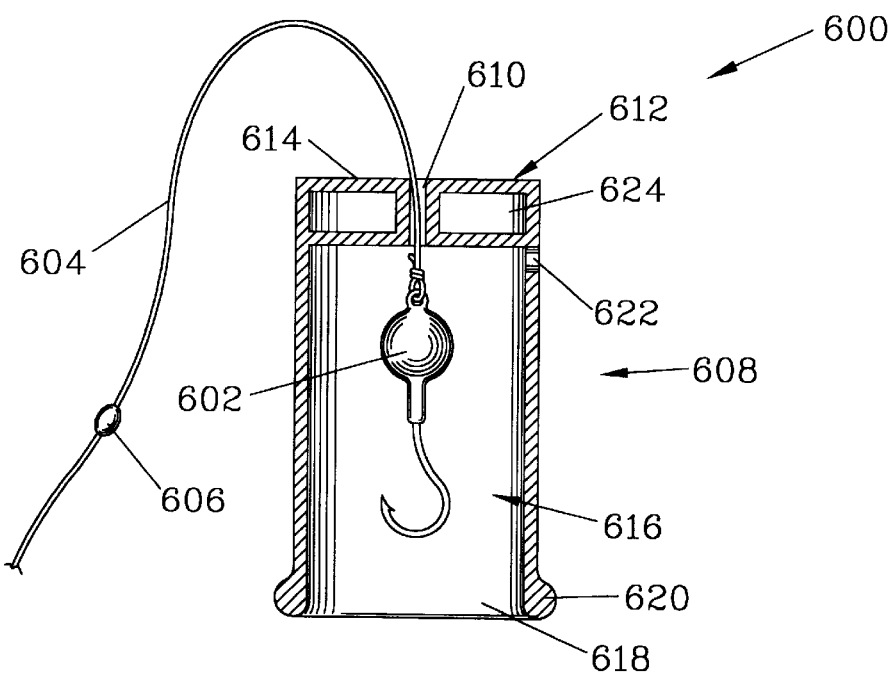
FIG. 15 illustrates a float system which may be employed with a conventional fishing pole. The float system has a depth control clip and a float which incorporates several features of the line carriers shown in FIGS. 8 through 11.

FIG. 15 illustrates a float system 600 which may be employed with a conventional fishing pole (not shown) to allow controlling the depth of a hook 602 attached to a fishing line 604. The float system 600 employs a depth control clip 606, which is attached to the fishing line 604 in a spaced apart relationship to the hook 602.

The depth control clip 606 is employed in combination with a float 608. The float 608 illustrated incorporates many of the features of the line carriers (200 and 300) shown in FIGS. 8 through 11, and is manually cast by the user in the same manner as a conventional float or bobber. The float system 600 allows many of the benefits of the present invention discussed above to be enjoyed with conventional fishing poles.

The float 608 has a float passage 610 which slidably engages the fishing line 604. The float 608 is preferably formed with a rear portion 612, having a rear surface 614, and an enclosure 616, having a forward opening 618. The float passage extends between the rear surface 614 and the enclosure 616. The hook 602 is contained in the enclosure 616 when the float 608 is cast by the user, reducing the chances of snagging the hook 602.

Means for preventing passage of the hook 602 through the float passage 610 are provided. In the float system 600, the means for preventing passage of the hook 602 through the float passage 610 are provided by sizing the float passage 610 smaller than the hook 602. When the hook 602 is retrieved, it is drawn into the enclosure 616 to reduce the chances of snagging on weeds and other obstructions.

Means for engaging the depth control clip 606 when the hook 602 is a desired distance from the float 608 are also provided. In the float system 600, the means for engaging the depth control clip 606 when the hook 602 is a desired distance from the float 608 are provided by sizing the depth control clip 606 larger than the float passage 610. When the float 608 is cast and hits the water, and floats thereupon, the hook 602 sinks until the depth control clip 606 engages the float passage 610.

The float 600 is preferably provided with a weight 620 positioned adjacent to the forward opening 618. When the float 608 is cast and hits the water, the weight 620 sinks to cause prompt tipping of the float 608 to release the hook 602 from the enclosure 616. It is also preferred to provide an air bleed vent 622 which communicates with the enclosure 616 to prevent air in the enclosure 616 from becoming trapped and delaying the sinking of the weight 620. To assure that the float 600 has an overall specific gravity less than that of water when constructed of a relatively dense material such as plastic, the rear portion 612 is formed with an air chamber 624.

While the novel features of the present invention have been described in terms of particular embodiments and preferred applications, it should be appreciated by one skilled in the art that substitution of materials and modification of details obviously can be made without departing from the spirit of the invention.

What I claim is:

1. A fishing pole which can throw a fishing line connected to a hook, the fishing line being retained on a fishing reel, the fishing pole comprising:
    a handle, said handle having a reel mount for mounting the fishing reel to said handle;
    a flexible rod having a longitudinal rod axis and having an internal axial rod passage therethrough through which the fishing line passes, said rod having a rod tip and a rod base, said rod base being attached to said handle;
    a spring seat fixably positioned with respect to said rod base;
    a compression spring axially aligned with said rod, through which said rod passes, said compression spring having a base end, which engages said spring seat, and a working end;
    a line carrier which engages the fishing line, said line carrier having a guide passage therethrough which is slidably engageable with said rod, said line carrier also having a spring-bearing surface for engaging said working end of said compression spring, said spring-bearing surface terminating said guide passage; and
    means for preventing passage of the hook through said rod passage.

2. The fishing pole of claim 1 wherein said line carrier is fixably engaged with the fishing line and is attached to the hook, said line carrier providing said means for preventing passage of the hook through said rod passage.

3. The fishing pole of claim 2 wherein said line carrier is configured to function as a lure.

4. The fishing pole of claim 1 wherein said line carrier slidably engages the fishing line.

5. The fishing pole of claim 4 wherein said guide passage of said line carrier slidably engages the fishing line, further wherein said means for preventing passage of the hook through said rod passage is provided by sizing said guide passage and the hook such that the hook cannot pass through said guide passage.

6. The fishing pole of claim 4 wherein said line carrier has an overall specific gravity less than that of water and further comprises:
    a rear portion having a rear surface of said line carrier thereon; and
    an enclosure extending forward from said rear portion, said enclosure having a forward opening which allows placing the hook into said enclosure.

7. The fishing pole of claim 6 wherein said guide passage of said line carrier slidably engages the fishing line, further wherein said means for preventing passage of the hook through said rod passage is provided by sizing said guide passage and the hook such that the hook cannot pass through said guide passage.

8. The fishing pole of claim 6 wherein said guide passage of said line carrier slidably engages the fishing line, further wherein said means for preventing passage of the hook through said rod passage further comprises:
    an eyelet in said enclosure of said line carrier, the fishing line passing through said eyelet, said eyelet being sized sufficiently small as to prevent passage of the hook therethrough.

9. The fishing pole of claim 8 wherein said eyelet is substantially aligned with said guide passage, the fishing pole further comprising:
    a depth control clip attached to the fishing line in a spaced apart relationship to the hook, said depth control clip being sized to pass through said rod passage, but not through said eyelet.

10. The fishing pole of claim 8 wherein said line carrier further comprises:
    a cocking protrusion, said cocking protrusion extending from said line carrier in a direction substantially normal to said guide passage and being configured to be readily grasped by the hand of a user.

11. The fishing pole of claim 6 wherein said guide passage of said line carrier is offset from said enclosure, said line carrier further comprising:
    a line passage which communicates between said rear surface and said enclosure, said line passage slidably engaging the fishing line,
    further wherein said means for preventing passage of the hook through said rod passage is provided by sizing said line passage and the hook such that the hook cannot pass through said line passage.

12. The fishing pole of claim 11 wherein said line carrier further comprises:
    a weight adjacent to said forward opening; and
    at least one air bleed vent communicating with said enclosure.

13. The fishing pole of claim 12 wherein said weight is positioned opposite said guide passage, further wherein said line passage is substantially aligned with and communicates with said guide passage.

14. The fishing pole of claim 13 wherein said guide passage of said line carrier further comprises:
    a ramp extending to said rear surface of said line carrier, said line passage extending between said enclosure and said ramp.

15. The fishing pole of claim 14 further comprising:
    a depth control clip attached to the fishing line in a spaced apart relationship to the hook, said depth control clip being sized to pass through said rod passage, but not through said line passage.

16. The fishing pole of claim 15 wherein said line carrier further comprises:
    a cocking protrusion, said cocking protrusion extending from said line carrier in a direction substantially normal to said guide passage and being configured to be readily grasped by the hand of a user to facilitate pulling said line carrier along said rod towards said rod base.

17. The fishing pole of claim 1 wherein said rod further comprises:

indicia positioned along said rod to provide reference to the position of said line carrier with respect to said spring seat when said guide passage is slidably engaged with said rod.

18. The fishing pole of claim 1 wherein said spring seat is provided by said handle, further wherein said rod is provided with a constant outside diameter D and wherein a diameter d of said rod passage increases as said rod tip is approached.

19. The fishing pole of claim 1 wherein said rod further comprises:

a tip liner having a rounded-off opening which terminates said rod passage.

20. The fishing pole of claim 1 wherein said handle further comprises:

a reel mounting portion of said handle, on which said reel mount is provided;

a rod mounting portion of said handle, to which said rod is attached; and a lockable hinge between said reel mounting portion and said rod mounting portion, said lockable hinge allowing said reel mounting portion and said rod mounting portion to be pivoted between and locked in either a working configuration, where said reel mounting portion and said rod are in an end-to-end relationship, and a storage configuration, where said reel mounting portion and said rod are in a side-by-side relationship.

21. The fishing pole of claim 1 wherein the fishing pole further comprises:

a storage recess in said handle; and means for threading the fishing line through said rod passage, said means for threading the fishing line through said rod passage being configured to reside in said storage recess.

22. The fishing pole of claim 1 wherein said rod further comprises:

means for maintaining said compression spring engaged with said spring seat.

23. The fishing pole of claim 22 wherein said means for maintaining said compression spring engaged with said spring seat further comprises:

spring-retaining lugs which project substantially normal to said rod.

24. A floating line carrier for use with a fishing rod used for casting a fishing line attached to a hook, the floating line carrier comprising:

a line carrier rear portion;

an enclosure extending from said line carrier rear portion, said enclosure having a forward opening which allows the hook to be placed into said enclosure; and a guide passage passing through said line carrier rear portion and configured to allow the fishing rod to pass completely therethrough, said guide passage capable of directing the line carrier along the fishing rod, and being sized to be slidably engagable with the fishing rod.

25. The floating line carrier of claim 24 further comprising:

a line passage through said line carrier rear portion, the fishing line passing through said line passage, said line passage being sized sufficiently small as to prevent passage of the hook therethrough.

26. The line carrier of claim 25 wherein said guide passage is offset from said enclosure, further wherein said line passage is substantially aligned with and communicates with said guide passage.

27. The line carrier of claim 26 wherein said guide passage further comprises:

a ramp extending to a rear surface of said line carrier rear portion, said line passage extending between said enclosure and said ramp.

* * * * *